(12) United States Patent
Mizuta et al.

(10) Patent No.: US 8,114,930 B2
(45) Date of Patent: Feb. 14, 2012

(54) ANTI-ADHESION AGENT COMPOSITION FOR ASPHALT

(75) Inventors: Motonari Mizuta, Ohmacho (JP); Ebana Hiroatsu, Ohmacho (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 12/856,979

(22) Filed: Aug. 16, 2010

(65) Prior Publication Data

US 2011/0046282 A1 Feb. 24, 2011

(30) Foreign Application Priority Data

Aug. 20, 2009 (JP) .................................. 2009-191243
Mar. 31, 2010 (JP) .................................. 2010-84273

(51) Int. Cl.
*B32B 7/12* (2006.01)
*C08K 5/16* (2006.01)
*C08K 5/00* (2006.01)
*C08K 5/20* (2006.01)
*C08G 63/685* (2006.01)
*C08G 63/60* (2006.01)
*C08L 67/00* (2006.01)
*C08L 73/00* (2006.01)
*C08L 77/00* (2006.01)
*C08L 79/00* (2006.01)

(52) U.S. Cl. ......... 524/186; 524/221; 524/241; 524/599

(58) Field of Classification Search .................. 524/186, 524/221, 241, 599
See application file for complete search history.

(56) References Cited

U.S. PATENT DOCUMENTS 4,166,050 A * 8/1979 Miyazako et al. ............... 524/24
5,883,157 A * 3/1999 Yamashita et al. ............. 523/161
6,143,812 A * 11/2000 Martin et al. .................... 524/43
6,486,249 B1 11/2002 Dituro et al.

FOREIGN PATENT DOCUMENTS

JP 2006-241409 9/2006
WO WO 03/035809 * 5/2003

OTHER PUBLICATIONS

Extended European Search Report issued Feb. 22, 2011 in European Application No. 10008382.3.

* cited by examiner

*Primary Examiner* — Mark Eashoo
*Assistant Examiner* — Angela C Scott
(74) *Attorney, Agent, or Firm* — Wenderoth, Lind & Ponack, L.L.P.

(57) ABSTRACT

An anti-adhesion agent composition for asphalt contains a specific polycarboxylic acid compound (A); a surfactant (B) that is at least one selected from a betaine amphoteric surfactant, an amino acid amphoteric surfactant, a polyoxyethylene alkylamine surfactant, an alkanolamide surfactant, and an amine oxide surfactant; and a water-soluble polyhydric alcohol (C).

2 Claims, No Drawings

ANTI-ADHESION AGENT COMPOSITION FOR ASPHALT

BACKGROUND OF THE INVENTION

1. Field of the Invention

The present invention relates to an anti-adhesion agent composition for asphalt, the anti-adhesion agent composition having excellent sprayability and a high anti-adhesion property for asphalt, persistently providing such an anti-adhesion effect, and having excellent storage stability.

2. Description of the Related Art

An asphalt mixture in which asphalt and aggregate have been mixed together is used to pave roads. Such an asphalt mixture is loaded onto the bed of a truck in an asphalt mixture plant and carried to a work site on a road. In the loading of an asphalt mixture onto the bed of a truck, since the asphalt mixture has a high temperature of about 200° C., the asphalt mixture adheres to the bed made of metal and a portion of the asphalt mixture cannot be used for the performance of work. Furthermore, in asphalt mixture plants, asphalt mixtures adhere to mixers, hoppers, and conveyor belts, which is also problematic.

Accordingly, to suppress adhesion of asphalt mixtures, diesel oil has been sprayed onto the beds of trucks and diesel oil has been periodically sprayed onto mixers, hoppers, and conveyor belts with spraying apparatuses installed therein. However, since diesel oil dissolves asphalt, such methods cause a problem in that the quality of asphalt mixtures is degraded. To solve the above-described problems, there is an asphalt anti-adhesion agent in which an ester oil or a nonionic surfactant that is less miscible with asphalt mixtures is turned into an emulsion (International Publication WO03/035809). However, since this agent is an emulsion and separates over time, stirring of the agent is required whenever it is used. Furthermore, when the agent is diluted in order to be sprayed and the diluted solution is stored in an outdoor tank, the diluted solution solidifies at low temperature in winter. Thus, the agent has a problem in terms of storage stability. There is also an asphalt anti-adhesion agent using a polyhydric alcohol (Japanese Unexamined Patent Application Publication No. 2006-241409). However, such an agent composed of only a polyhydric alcohol does not spread sufficiently over metal surfaces and hence does not provide a sufficiently high anti-adhesion property for asphalt. There is also an asphalt anti-adhesion agent using a polyhydric alcohol, polyvinyl alcohol, a polyalkyl glycol, and derivatives of the polyalkyl glycol (U.S. Pat. No. 6,486,249). However, use of such a combination of polyvinyl alcohol, a polyalkyl glycol, and derivatives of the polyalkyl glycol does not provide a sufficiently high spreadability over metal surfaces for the agent. Thus, such an agent does not have excellent sprayability and does not provide a sufficiently high anti-adhesion property for asphalt.

SUMMARY OF THE INVENTION

Accordingly, it is an object of the present invention to provide an anti-adhesion agent composition for asphalt, the anti-adhesion agent composition having excellent sprayability and a high anti-adhesion property for asphalt, persistently providing such an anti-adhesion effect, and having excellent storage stability.

To overcome the above-described problems, the inventors of the present invention have performed thorough studies. As a result, they have found that an asphalt anti-adhesion agent composition containing a specific polycarboxylic acid compound, a specific surfactant, and a water-soluble polyhydric alcohol has excellent sprayability and a high anti-adhesion property for asphalt, persistently provides such an anti-adhesion effect, and has excellent storage stability.

Specifically, the present invention is as follows.

[1] An anti-adhesion agent composition for asphalt, the anti-adhesion agent composition including:

(A) a copolymer having an average molecular weight of 5,000 to 100,000 and including constitutional units represented by Formulae (1) and (2) below in which a ratio of the constitutional unit represented by Formula (1) to the constitutional unit represented by Formula (2) is 3:7 to 7:3;

(B) a surfactant that is at least one selected from a betaine amphoteric surfactant, an amino acid amphoteric surfactant, a polyoxyethylene alkylamine surfactant, an alkanolamide surfactant, and an amine oxide surfactant; and (C) a water-soluble polyhydric alcohol, wherein the anti-adhesion agent composition contains 0.5 to 10 mass % of the copolymer (A), 0.1 to 5 mass % of the surfactant (B), and 85 to 99.4 mass % of the water-soluble polyhydric alcohol (C),

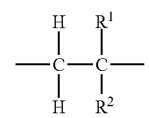

(1)

where $R^1$ represents a hydrogen atom or a methyl group; and $R^2$ represents an alkyl group containing 4 to 18 carbon atoms or a phenyl group,

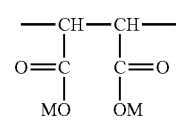

(2)

where Ms independently represent a hydrogen atom, an alkali metal, ammonium, or an organic ammonium.

[2] The anti-adhesion agent composition for asphalt, wherein the surfactant (B) is at least one selected from compounds represented by Formulae (3) to (7) below:

the betaine amphoteric surfactant that is a compound represented by Formula (3)

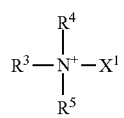

(3)

where $R^3$ represents an alkyl group containing 10 to 18 carbon atoms, an alkenyl group containing 10 to 18 carbon atoms, or $R^6NH(CH_2)_p-$; $R^4$ and $R^5$ independently represent an alkyl group containing 1 to 3 carbon atoms; $X^1$ represents $-(CH_2)_qCOO^-$, $-CH_2CH(OH)CH_2SO_3^-$, or $-(CH_2)_rPO_4^-$; $R^6$ represents an aliphatic acyl group containing 10 to 18 carbon atoms; and p, q, and r independently represent an integer of 1 to 3, the amino acid amphoteric surfactant that is a compound represented by Formula (4)

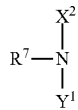
(4)

where $R^7$ represents an alkyl group containing 10 to 18 carbon atoms, an alkenyl group containing 10 to 18 carbon atoms, or $R^8NX^3(CH_2)_s—$; $X^2$ represents a hydrogen atom, a hydroxyethyl group, or $—(CH_2)_tCOOM^1$; $Y^1$ represents $—(CH_2)_uCOOM^2$; $M^1$ and $M^2$ independently represent a hydrogen atom, an alkali metal, an alkaline-earth metal, ammonium, or an organic ammonium; $R^8$ represents an aliphatic acyl group containing 10 to 18 carbon atoms; $X^3$ represents a hydrogen atom or a hydroxyethyl group; and s, t, and u independently represent an integer of 1 to 3, the polyoxyethylene alkylamine surfactant that is a compound represented by Formula (5)

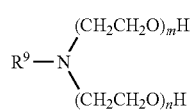
(5)

where $R^9$ represents an alkyl group containing 10 to 18 carbon atoms or an alkenyl group containing 10 to 18 carbon atoms; m and n represent an average degree of polymerization and m+n is 1 to 30, the alkanolamide surfactant that is a compound represented by Formula (6)

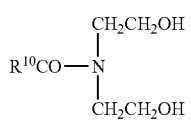
(6)

where $R^{10}CO$ represents an aliphatic acyl group containing 10 to 18 carbon atoms, and the amine oxide surfactant that is a compound represented by Formula (7)

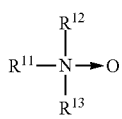
(7)

where $R^{11}$ represents an alkyl group containing 10 to 18 carbon atoms, an alkenyl group containing 10 to 18 carbon atoms, or $R^{14}NH(CH_2)_v—$; $R^{12}$ and $R^{13}$ independently represent an alkyl group containing 1 to 3 carbon atoms or a hydroxyalkyl group containing 1 to 3 carbon atoms; $R^{14}$ represents an aliphatic acyl group containing 10 to 18 carbon atoms; and v represents an integer of 1 to 3.

An anti-adhesion agent composition for asphalt according to the present invention has excellent sprayability and a high anti-adhesion property for asphalt, persistently provides such an anti-adhesion effect, and has excellent storage stability.

DESCRIPTION OF THE PREFERRED EMBODIMENTS

Hereinafter, the present invention will be described in further detail with reference to an embodiment.

In Formula (1) of the present embodiment, $R^1$ represents a hydrogen atom or a methyl group; and $R^2$ represents an alkyl group containing 4 to 18 carbon atoms or a phenyl group.

A constitutional unit represented by Formula (1) is derived from a linear or branched α-olefin containing 6 to 20 carbon atoms or a styrene monomer and can be obtained by polymerizing such a monomer. Specific examples of such a monomer include: linear olefins such as 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, and 1-octadecene; branched olefins such as 2-methylpentene and diisobutylene; and styrene monomers such as styrene and α-methyl styrene. Of these, branched olefins are preferred in view of the stability of the composition at low temperature and diisobutylene is particularly preferred.

In Formula (2) of the present embodiment, Ms independently represent a hydrogen atom, an alkali metal, ammonium, or an organic ammonium. Examples of the alkali metal include lithium, sodium, and potassium. The alkali metal is preferably sodium or potassium. Examples of the organic ammonium include alkanolammoniums such as monoethanolammonium, diethanolammonium, and triethanolammonium; and alkyl ammoniums such as diethylammonium and triethylammonium.

A constitutional unit represented by Formula (2) can be obtained by polymerizing maleic anhydride, subjecting the resultant polymer to hydrolysis, and neutralizing the resultant hydrolysate with a basic compound to provide a salt including the constitutional unit.

The molar ratio of a constitutional unit represented by Formula (1) to a constitutional unit represented by Formula (2) is 3:7 to 7:3 and preferably 5:5.

The component (A) used in the present embodiment can be obtained by an existing method with, as raw materials, a linear or branched α-olefin containing 6 to 20 carbon atoms or a styrene monomer and maleic anhydride. Examples of such an α-olefin and a styrene monomer are described above. For example, the component (A) can be obtained by copolymerizing such raw materials in an organic solvent with a polymerization initiator and subjecting the resultant polymer to hydrolysis.

A copolymer serving as the component (A) has a weight average molecular weight of 5,000 to 100,000, preferably 7,000 to 70,000. When the weight average molecular weight is less than 5,000, the anti-adhesion effect cannot be provided for a sufficiently long period of time.

The amount of the component (A) contained in the composition is in the range of 0.5 to 10 mass %, preferably 1 to 8 mass %. When the amount of the component (A) is less than 0.5 mass %, the anti-adhesion effect cannot be provided persistently. When the amount of the component (A) is more than 10 mass %, advantages appropriate to such an amount are not provided, which is not cost-effective.

The component (B) used in the present embodiment is a surfactant that is at least one selected from a betaine amphoteric surfactant, an amino acid amphoteric surfactant, a polyoxyethylene alkylamine surfactant, an alkanolamide surfactant, and an amine oxide surfactant. The component (B) may be constituted by a single surfactant or two or more surfactants. The component (B) is preferably a betaine amphoteric surfactant, a polyoxyethylene alkylamine surfactant, or an alkanolamide surfactant.

To further enhance the sprayability and the anti-adhesion property for asphalt of the composition, the component (B) is preferably constituted by a combination of a betaine amphoteric surfactant and a polyoxyethylene alkylamine surfactant; a combination of a betaine amphoteric surfactant and an alkanolamide surfactant; or a combination of a polyoxyethylene alkylamine surfactant and an alkanolamide surfactant.

The amount of the component (B) contained in the composition is in the range of 0.1 to 5 mass %. When the amount of the component (B) is less than 0.1 mass %, the sprayability of the composition is poor. When the amount of the component (B) is more than 5 mass %, advantages appropriate to such an amount are not provided, which is not cost-effective.

The betaine amphoteric surfactant is represented by Formula (3).

In Formula (3), $R^3$ represents an alkyl group containing 10 to 18 carbon atoms, an alkenyl group containing 10 to 18 carbon atoms, or $R^6NH(CH_2)_p$—; $R^4$ and $R^5$ independently represent an alkyl group containing 1 to 3 carbon atoms; and $R^6$ represents an aliphatic acyl group containing 10 to 18 carbon atoms.

As for $R^3$, examples of the alkyl group containing 10 to 18 carbon atoms and the alkenyl group containing 10 to 18 carbon atoms include a capryl group, a lauryl group, a myristyl group, a palmityl group, a stearyl group, an oleyl group, a coconut oil alkyl group, and a beef tallow alkyl group. Of these, a lauryl group, a myristyl group, an oleyl group, a coconut oil alkyl group, and a beef tallow alkyl group are preferred.

Examples of $R^4$ and $R^5$ include a methyl group, an ethyl group, and a propyl group. Of these, a methyl group is preferred.

Examples of $R^6$ include a caproyl group, a lauroyl group, a myristoyl group, a palmitoyl group, a stearoyl group, an oleoyl group, a cocoyl group, and a beef tallow acyl group. Of these, a lauroyl group, a myristoyl group, a cocoyl group, and an oleoyl group are preferred.

$X^1$ is a group represented by —$(CHA_2)_qCOO^-$, —$CH_2CH(OH)CH_2SO_3^-$, or —$(CH_2)_rPO_4^-$. Of these, groups represented by —$(CH_2)_qCOO^-$ are preferred. p, q, and r independently represent an integer of 1 to 3.

Specific examples of the betaine amphoteric surfactant include myristyl dimethyl aminoacetic acid betaine, coconut oil fatty acid amido propyl dimethyl aminoacetic acid betaine, oleic acid amido propyl dimethyl aminoacetic acid betaine, myristyl dimethyl-2-hydroxypropyl sulfobetaine, oleic acid amido propyl dimethyl-2-hydroxypropyl sulfobetaine, myristyl dimethyl amino phosphobetaine, and coconut oil fatty acid amido propyl dimethyl amino phosphobetaine. Of these, coconut oil fatty acid amido propyl dimethyl aminoacetic acid betaine and oleic acid amido propyl dimethyl aminoacetic acid betaine are preferred.

The amino acid amphoteric surfactant is represented by Formula (4).

In Formula (4), $R^7$ represents an alkyl group containing 10 to 18 carbon atoms, an alkenyl group containing 10 to 18 carbon atoms, or $R^8NX^3(CH_2)_s$—; and $R^8$ represents an aliphatic acyl group containing 10 to 18 carbon atoms.

As for $R^7$, examples of the alkyl group containing 10 to 18 carbon atoms and the alkenyl group containing 10 to 18 carbon atoms include a capryl group, a lauryl group, a myristyl group, a palmityl group, a stearyl group, an oleyl group, a coconut oil alkyl group, and a beef tallow alkyl group. Of these, a lauryl group, a myristyl group, an oleyl group, a coconut oil alkyl group, and a beef tallow alkyl group are preferred. Examples of $R^8$ include a caproyl group, a lauroyl group, a myristoyl group, a palmitoyl group, a stearoyl group, an oleoyl group, a cocoyl group, and a beef tallow acyl group. Of these, a lauroyl group, a myristoyl group, an oleoyl group, a cocoyl group, and a beef tallow acyl group are preferred.

$X^3$ represents a hydrogen atom or a hydroxyethyl group; $X^2$ represents a hydrogen atom, a hydroxyethyl group, or —$(CH_2)_tCOOM^1$; and $Y^1$ represents —$(CH_2)_uCOOM^2$.

$M^1$ and $M^2$ independently represent a hydrogen atom, an alkali metal, an alkaline-earth metal, ammonium, or an organic ammonium; and s, t, and u independently represent an integer of 1 to 3. Examples of the alkali metal include lithium, sodium, and potassium. Examples of the alkaline-earth metal include ½ calcium and ½ magnesium. Examples of the organic ammonium include monoethanolammonium, diethanolammonium, and triethanolammonium.

Specific examples of the amino acid amphoteric surfactant include coconut oil fatty acid amido ethyl hydroxyethyl glycine sodium salt, coconut oil fatty acid amido hydroxyethyl iminodiacetic acid sodium salt, lauryl iminodiacetic acid sodium salt, and β-lauryl aminopropionic acid sodium salt.

The polyoxyethylene alkylamine surfactant is represented by Formula (5).

In Formula (5), $R^9$ represents an alkyl group containing 10 to 18 carbon atoms or an alkenyl group containing 10 to 18 carbon atoms. Examples of $R^9$ include a capryl group, a lauryl group, a myristyl group, a palmityl group, a stearyl group, an oleyl group, a coconut oil alkyl group, and a beef tallow alkyl group. Of these, an oleyl group, a coconut oil alkyl group, and a beef tallow alkyl group are preferred.

m and n represent an average degree of polymerization of an oxyethylene group. m+n is 1 to 30, preferably 2 to 15.

Specific examples of the polyoxyethylene alkylamine surfactant include polyoxyethylene caprylamine, polyoxyethylene laurylamine, polyoxyethylene myristylamine, polyoxyethylene palmitylamine, polyoxyethylene stearylamine, polyoxyethylene oleylamine, polyoxyethylene coconut oil alkyl amine, and polyoxyethylene beef tallow alkyl amine. Of these, polyoxyethylene oleylamine, polyoxyethylene coconut oil alkyl amine, and polyoxyethylene beef tallow alkyl amine are preferred.

The alkanolamide surfactant is represented by Formula (6).

In Formula (6), $R^{10}CO$ represents an aliphatic acyl group containing 10 to 18 carbon atoms. Examples of $R^{10}CO$ include a caproyl group, a lauroyl group, a myristoyl group, a palmitoyl group, a stearoyl group, an oleoyl group, a cocoyl group, and a beef tallow acyl group. Of these, a lauroyl group, a myristoyl group, an oleoyl group, and a cocoyl group are preferred.

Specific examples of the alkanolamide surfactant include capric acid diethanolamide, lauric acid diethanolamide, myristic acid diethanolamide, palmitic acid diethanolamide, stearic acid diethanolamide, oleic acid diethanolamide, coconut oil fatty acid diethanolamide, and beef tallow fatty acid diethanolamide. Of these, oleic acid diethanolamide and coconut oil fatty acid diethanolamide are preferred.

The amine oxide surfactant is represented by Formula (7).

In Formula (7), $R^{11}$ represents an alkyl group containing 10 to 18 carbon atoms, an alkenyl group containing 10 to 18 carbon atoms, or $R^{14}NH(CH_2)_v$—; v represents an integer of 1 to 3; $R^{12}$ and $R^{13}$ independently represent an alkyl group containing 1 to 3 carbon atoms or a hydroxyalkyl group containing 1 to 3 carbon atoms; and $R^{14}$ represents an aliphatic acyl group containing 10 to 18 carbon atoms. As for $R^{11}$, examples of the alkyl group containing 10 to 18 carbon atoms and the alkenyl group containing 10 to 18 carbon atoms include a capryl group, a lauryl group, a myristyl group, a palmityl group, a stearyl group, an oleyl group, a coconut oil alkyl group, and a beef tallow alkyl group. Examples of $R^{14}$ include a caproyl group, a lauroyl group, a myristoyl group, a palmitoyl group, a stearoyl group, an oleoyl group, a cocoyl group, and a beef tallow acyl group. Examples of $R^{12}$ and $R^{13}$ include a methyl group, an ethyl group, a propyl group, a hydroxymethyl group, a hydroxyethyl group, and a hydroxypropyl group.

Specific examples of the amine oxide surfactant include dimethyl capryl amine oxide, dimethyl lauryl amine oxide, dimethyl myristyl amine oxide, dimethyl palmityl amine oxide, dimethyl stearyl amine oxide, dimethyl oleyl amine oxide, dimethyl coconut oil alkyl amine oxide, dimethyl beef tallow alkyl amine oxide, dihydroxyethyl capryl amine oxide, dihydroxyethyl lauryl amine oxide, dihydroxyethyl myristyl amine oxide, dihydroxyethyl palmityl amine oxide, dihydroxyethyl stearyl amine oxide, dihydroxyethyl oleyl amine oxide, dihydroxyethyl coconut oil alkyl amine oxide, dihydroxyethyl beef tallow alkyl amine oxide, capric acid amido propyl dimethyl amine oxide, lauric acid amido propyl dimethyl amine oxide, myristic acid amido propyl dimethyl amine oxide, palmitic acid amido propyl dimethyl amine oxide, stearic acid amido propyl dimethyl amine oxide, oleic acid amido propyl dimethyl amine oxide, coconut oil fatty acid amido propyl dimethyl amine oxide, and beef tallow fatty acid amido propyl dimethyl amine oxide.

The component (C) used in the present embodiment is a water-soluble polyhydric alcohol that is in the form of liquid at room temperature. Specific examples of the component (C) include ethylene glycol, diethylene glycol, propylene glycol, butylene glycol, glycerin, diglycerin, triglycerin, and tetraglycerin. The component (C) is preferably a polyhydric alcohol that is dihydric to tetrahydric and contains 2 to 6 carbon atoms. Such polyhydric alcohols can be used alone or in combination.

The amount of the component (C) contained in the composition is in the range of 85 to 99.4 mass %, preferably in the range of 87 to 98 mass %. When the amount of the component (C) is less than 85 mass %, the storage stability of the composition is poor. When the amount of the component (C) is more than 99.4 mass %, the sprayability of the composition is poor.

An anti-adhesion agent composition for asphalt according to the present embodiment may be used without being treated. However, for ease of handling, such an anti-adhesion agent composition for asphalt may be diluted with water and then used.

As long as the advantages of the present invention can be achieved, an anti-adhesion agent composition for asphalt according to the present embodiment may be combined with an additive or additives such as a coloring agent, a rust inhibitor, and an antiseptic agent.

EXAMPLES

Hereinafter, the present invention will be more specifically described with reference to examples.

As for copolymers used in Examples and Comparative examples, copolymers of compounds corresponding to Formulae (1) and (2) and being summarized in Table 1 below were used. The weight average molecular weight of the copolymers was determined by gel permeation chromatography. As for the component (B), compounds B1 to B17 shown in Table 2 below were used.

TABLE 1

|  | Formula (1) | | | Formula (1): maleic anhydride (molar ratio) | Formula (2) | Weight average molecular weight of polymer (A) |
| --- | --- | --- | --- | --- | --- | --- |
|  | Monomer | $R^1$ | $R^2$ |  | M |  |
| Copolymer 1 | diisobutylene | $CH_3$ | $CH_2C(CH_3)_3$ | 5:5 | $NH_4$ | 8,000 |
| Copolymer 2 | α-methyl styrene | $CH_3$ | $C_6H_5$ | 5:5 | Na | 25,000 |
| Copolymer 3 | styrene | H | $C_6H_5$ | 6:4 | Na | 10,000 |
| Copolymer 4 | decene | H | $(CH_2)_7CH_3$ | 5:5 | Na | 12,000 |
| Copolymer 5 | diisobutylene | $CH_3$ | $CH_2C(CH_3)_3$ | 6:4 | $NH(C_2H_4OH)_3$ | 15,000 |
| Copolymer 6 | diisobutylene | $CH_3$ | $CH_2C(CH_3)_3$ | 5:5 | Na | 30,000 |
| Copolymer 7 | styrene | H | $C_6H_5$ | 4:6 | Na | 10,000 |

TABLE 2

|  | Type | Name of surfactant | Structure |
| --- | --- | --- | --- |
| B1 | betaine | myristyl dimethyl aminoacetic acid betaine | Formula (3): $R^3$ = a myristyl group; $R^4$ and $R^5$ = methyl groups; $X^1$ = —$(CH_2)_q$COO$^-$; q = 1 |
| B2 | betaine | coconut oil fatty acid amido propyl dimethyl aminoacetic acid betaine | Formula (3): $R^3$ = $R^6$NH$(CH_2)_p$—; $R^4$ and $R^5$ = methyl groups; $R^6$ = a cocoyl group; $X^1$ = —$(CH_2)_q$COO$^-$; p = 3; q = 1 |
| B3 | betaine | oleic acid amido propyl dimethyl aminoacetic acid betaine | Formula (3): $R^3$ = $R^6$NH$(CH_2)_p$—; $R^4$ and $R^5$ = methyl groups; $R^6$ = an oleoyl group; $X^1$ = —$(CH_2)_q$COO$^-$; p = 3; q = 1 |
| B4 | amino acid | sodium lauryl iminodipropionate | Formula (4): $R^7$ = a lauryl group; $X^2$ = —$(CH_2)_t$COOM$^1$; $Y^1$ = —$(CH_2)_u$COOM$^2$; $M^1$ = sodium; $M^2$ = a hydrogen atom; t and u = 2 |

TABLE 2-continued

| | Type | Name of surfactant | Structure |
|---|---|---|---|
| B5 | amino acid | sodium coconut oil fatty acid amido ethyl hydroxyethyl glycine | Formula (4): $R^7 = R^8NX^3(CH_2)_s$-; $X^3$ = a hydroxyethyl group; $X^2$ = a hydrogen atom; $R^8$ = a cocoyl group; $Y^1$ = —$(CH_2)_uCOOM^2$; $M^2$ = sodium; s = 2; u = 1 |
| B6 | polyoxyethylene alkylamine | polyoxyethylene coconut oil alkyl amine (EO adduct molar number: 15.2) | Formula (5): $R^9$ = a coconut oil alkyl group; m + n = 15.2 |
| B7 | polyoxyethylene alkylamine | polyoxyethylene oleylamine (EO adduct molar number: 5) | Formula (5): $R^9$ = an oleyl group; m + n = 5 |
| B8 | polyoxyethylene alkylamine | polyoxyethylene beef tallow alkyl amine (EO adduct molar number: 25.5) | Formula (5): $R^9$ = a beef tallow alkyl group; m + n = 25.5 |
| B9 | alkanolamide | coconut oil fatty acid diethanolamide | Formula (6): $R^{10}CO$ = a cocoyl group |
| B10 | alkanolamide | oleic acid diethanolamide | Formula (6): $R^{10}CO$ = an oleoyl group |
| B11 | amine oxide | dihydroxyethyl lauryl amine oxide | Formula (7): $R^{11}$ = a lauryl group; $R^{12}$ and $R^{13}$ = hydroxyethyl groups |
| B12 | nonionic | sorbitan monooleate (HLB = 4.3) | — |
| B13 | anionic | sodium coconut oil fatty acid methyltaurate | — |
| B14 | anionic | sodium lauryl sulfonate | — |
| B15 | nonionic | polyoxyethylene monooleate (EO adduct molar number: 2, HLB = 8.3) | — |
| B16 | nonionic | polyoxyethylene lauryl ether (EO adduct molar number: 7, HLB = 12.5) | — |
| B17 | nonionic | polyoxyethylene lauryl ether (EO adduct molar number: 30, HLB = 17.5) | — |

TABLE 3

| | | Example 1 | Example 2 | Example 3 | Example 4 | Example 5 | Example 6 | Example 7 |
|---|---|---|---|---|---|---|---|---|
| Component (A) (%) | Copolymer 1 | 1.5 | | | | | | 0.5 |
| | Copolymer 2 | | 1 | | | | | |
| | Copolymer 3 | | | 3 | | | | |
| | Copolymer 4 | | | | 7 | | | |
| | Copolymer 5 | | | | | | | 1.5 |
| | Copolymer 6 | | | | | 3 | | |
| | Copolymer 7 | | | | | | 2 | |
| Component (B) (%) | B1 | 1 | | | 5 | | 2 | |
| | B2 | | 0.5 | | | 1 | | |
| | B3 | | | 3 | | | | |
| | B4 | | | | | | | 3 |
| | B5 | | | | | | | |
| | B6 | | | | | | | |
| | B7 | | | | | | | |
| | B8 | | | | | | | |
| | B9 | | | | | | | |
| | B10 | | | | | | | |
| | B11 | | | | | | | |
| Component (C) (%) | propylene glycol | 97.5 | | | 88 | | | 55 |
| | butylene glycol | | 98.5 | | | | 46 | |
| | glycerin | | | 94 | | 96 | 50 | 40 |
| Another component (%) | B12 | | | | | | | |
| | B13 | | | | | | | |
| | B14 | | | | | | | |
| | B15 | | | | | | | |
| | B16 | | | | | | | |
| | B17 | | | | | | | |
| | Water * | 900 | 900 | 900 | 900 | 900 | 900 | 900 |
| Evaluation results | (1) Spraying test of diluted solution onto metal surface | Good | Good | Good | Good | Good | Good | Good |
| | (2) Anti-adhesion property | Good | Excellent | Excellent | Good | Excellent | Good | Good |
| | (3) Persistence of anti-adhesion effect | Good | Good | Good | Excellent | Good | Good | Good |
| | (4) Storage stability at 40° C. | Good | Good | Good | Good | Good | Good | Good |
| | at 25° C. | Good | Good | Good | Good | Good | Good | Good |
| | at −5° C. | Good | Good | Good | Good | Good | Good | Good |

| | | Example 8 | Example 9 | Example 10 | Example 11 | Example 12 | Example 13 | Example 14 |
|---|---|---|---|---|---|---|---|---|
| Component (A) (%) | Copolymer 1 | | | | | | | |
| | Copolymer 2 | | | 5 | | | | |
| | Copolymer 3 | | | | 7 | | | |
| | Copolymer 4 | | | | | | | |
| | Copolymer 5 | | | | | | | |

TABLE 3-continued

|  |  | 8 | 9 | 10 | 11 | 12 | 13 | 14 |
|---|---|---|---|---|---|---|---|---|
|  | Copolymer 6 | 8 |  |  | 3 | 3 | 3 | 3 |
|  | Copolymer 7 |  |  |  |  |  |  |  |
| Component (B) (%) | B1 | 2 |  |  |  |  |  |  |
|  | B2 |  | 1 |  |  |  |  |  |
|  | B3 | 2 |  |  |  |  |  |  |
|  | B4 |  |  |  |  |  |  |  |
|  | B5 |  |  | 4 | 0.5 |  |  |  |
|  | B6 |  |  |  |  | 3 |  |  |
|  | B7 |  |  |  |  |  | 1 |  |
|  | B8 |  |  |  |  |  | 5 |  |
|  | B9 |  |  |  |  |  |  | 4 |
|  | B10 |  |  |  |  |  |  |  |
|  | B11 |  |  |  |  |  |  |  |
| Component (C) (%) | propylene glycol | 88 |  |  |  |  | 92 |  |
|  | butylene glycol |  | 91 |  |  | 96 |  |  |
|  | glycerin |  |  | 91.5 | 94 |  |  | 93 |
| Another component (%) | B12 |  |  |  |  |  |  |  |
|  | B13 |  |  |  |  |  |  |  |
|  | B14 |  |  |  |  |  |  |  |
|  | B15 |  |  |  |  |  |  |  |
|  | B16 |  |  |  |  |  |  |  |
|  | B17 |  |  |  |  |  |  |  |
|  | Water * | 900 | 900 | 900 | 900 | 900 | 900 | 900 |
| Evaluation results | (1) Spraying test of diluted solution onto metal surface | Good | Good | Good | Good | Good | Good | Good |
|  | (2) Anti-adhesion property | Excellent | Good | Good | Good | Good | Good | Good |
|  | (3) Persistence of anti-adhesion effect | Excellent | Excellent | Excellent | Good | Good | Good | Good |
|  | (4) Storage stability at 40° C. | Good | Good | Good | Good | Good | Good | Good |
|  | at 25° C. | Good | Good | Good | Good | Good | Good | Good |
|  | at −5° C. | Good | Good | Good | Good | Good | Good | Good |

* Amount of water added relative to the amounts of the Components (A) to (C) and Another component, the amounts being defined as 100

TABLE 4

|  |  | Example |  |  |  |  |
|---|---|---|---|---|---|---|
|  |  | 15 | 16 | 17 | 18 | 19 |
| Component (A) (%) | Copolymer 1 |  |  |  |  |  |
|  | Copolymer 2 |  |  |  |  |  |
|  | Copolymer 3 |  |  |  |  |  |
|  | Copolymer 4 |  |  |  |  |  |
|  | Copolymer 5 |  |  |  |  |  |
|  | Copolymer 6 | 3 |  | 3 | 3 | 3 |
|  | Copolymer 7 |  | 8 |  |  |  |
| Component (B) (%) | B1 |  |  |  |  |  |
|  | B2 |  |  |  |  |  |
|  | B3 |  |  |  |  |  |
|  | B4 |  |  |  | 2 |  |
|  | B5 |  |  |  |  |  |
|  | B6 |  |  | 2 |  | 3 |
|  | B7 |  |  |  |  |  |
|  | B8 |  |  |  |  |  |
|  | B9 |  |  |  |  | 1 |
|  | B10 | 1 |  | 2 |  |  |
|  | B11 |  | 5 |  | 2 |  |
| Component (C) (%) | propylene glycol | 96 |  |  |  |  |
|  | butylene glycol |  | 87 |  |  |  |
|  | glycerin |  |  | 93 | 93 | 93 |
| Another component (%) | B12 |  |  |  |  |  |
|  | B13 |  |  |  |  |  |
|  | B14 |  |  |  |  |  |
|  | B15 |  |  |  |  |  |
|  | B16 |  |  |  |  |  |
|  | B17 |  |  |  |  |  |
|  | Water * | 900 | 900 | 900 | 900 | 900 |
| Evaluation results | (1) Spraying test of diluted solution onto metal surface | Good | Good | Excellent | Good | Excellent |
|  | (2) Anti-adhesion property | Good | Good | Excellent | Good | Excellent |
|  | (3) Persistence of anti-adhesion effect | Good | Good | Good | Good | Good |
|  | (4) Storage stability at 40° C. | Good | Good | Good | Good | Good |
|  | at 25° C. | Good | Good | Good | Good | Good |
|  | at −5° C. | Good | Good | Good | Good | Good |

TABLE 4-continued

|  |  | Example | | |
|---|---|---|---|---|
|  |  | 20 | 21 | 22 |
| Component (A) (%) | Copolymer 1 |  |  |  |
|  | Copolymer 2 |  |  |  |
|  | Copolymer 3 |  |  |  |
|  | Copolymer 4 |  |  |  |
|  | Copolymer 5 |  |  |  |
|  | Copolymer 6 | 3 | 3 | 3 |
|  | Copolymer 7 |  |  |  |
| Component (B) (%) | B1 | 3 |  |  |
|  | B2 |  | 2 |  |
|  | B3 |  |  | 2 |
|  | B4 |  |  |  |
|  | B5 |  |  |  |
|  | B6 |  |  |  |
|  | B7 |  |  |  |
|  | B8 | 1 |  |  |
|  | B9 |  |  |  |
|  | B10 |  | 2 | 2 |
|  | B11 |  |  |  |
| Component (C) (%) | propylene glycol |  |  |  |
|  | butylene glycol |  |  |  |
|  | glycerin | 93 | 93 | 93 |
| Another component (%) | B12 |  |  |  |
|  | B13 |  |  |  |
|  | B14 |  |  |  |
|  | B15 |  |  |  |
|  | B16 |  |  |  |
|  | B17 |  |  |  |
|  | Water * | 900 | 900 | 900 |
| Evaluation results | (1) Spraying test of diluted solution onto metal surface | Excellent | Excellent | Excellent |
|  | (2) Anti-adhesion property | Excellent | Excellent | Excellent |
|  | (3) Persistence of anti-adhesion effect | Good | Excellent | Excellent |
|  | (4) Storage stability at 40° C. | Good | Good | Good |
|  | at 25° C. | Good | Good | Good |
|  | at −5° C. | Good | Good | Good |

* Amount of water added relative to the amounts of the Components (A) to (C) and Another component, the amounts being defined as 100

TABLE 5

|  |  | Comparative example | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Component (A) (%) | Copolymer 1 |  |  | 3 | 15 |  |  |  |  |  |  |  |
|  | Copolymer 2 |  |  |  |  |  |  |  |  |  |  |  |
|  | Copolymer 3 |  |  |  |  |  |  |  |  |  |  |  |
|  | Copolymer 4 |  |  |  |  |  |  |  |  |  |  |  |
|  | Copolymer 5 |  |  |  |  |  |  |  |  |  |  |  |
|  | Copolymer 6 |  |  |  |  | 3 | 3 |  |  | 3 | 3 | 3 |
|  | Copolymer 7 |  |  |  |  |  |  |  |  |  |  |  |
| Component (B) (%) | B1 |  |  | 5 |  |  |  |  |  |  |  |  |
|  | B2 | 2 |  |  |  |  |  |  |  |  |  |  |
|  | B3 |  |  |  |  |  |  |  |  |  |  |  |
|  | B4 |  |  |  |  |  |  |  |  |  |  |  |
|  | B5 |  |  |  |  |  |  |  |  |  |  |  |
|  | B6 |  |  |  |  |  |  |  |  |  |  |  |
|  | B7 |  |  |  |  |  |  |  |  |  |  |  |
|  | B8 |  |  |  |  |  |  |  |  |  |  |  |
|  | B9 |  |  |  |  |  |  |  | 5 |  |  |  |
|  | B10 |  |  |  |  |  |  |  |  |  |  |  |
|  | B11 |  |  |  |  |  |  |  |  |  |  |  |
| Component (C) (%) | propylene glycol |  |  |  |  |  |  |  |  | 94 |  |  |
|  | butylene glycol | 98 |  | 80 |  |  |  |  |  |  | 92 |  |
|  | glycerin |  | 97 |  | 100 | 96 | 96 | 95 | 99.6 |  |  | 91 |
| Another component (%) | B12 |  |  |  |  | 1 |  |  |  |  |  |  |
|  | B13 |  |  |  |  |  | 1 |  |  |  |  |  |
|  | B14 |  |  |  |  |  |  |  | 0.4 |  |  |  |
|  | B15 |  |  |  |  |  |  |  |  | 3 |  |  |
|  | B16 |  |  |  |  |  |  |  |  |  | 5 |  |
|  | B17 |  |  |  |  |  |  |  |  |  |  | 6 |
|  | Water * | 900 | 900 | 900 | 900 | 900 | 900 | 900 | 900 | 900 | 900 | 900 |
| Evaluation results | (1) Spraying test of diluted solution onto metal surface | Good | Fair | Good | Poor | Fair | Fair | Good | Fair | Good | Good | Good |
|  | (2) Anti-adhesion property | Poor | Poor | Good | Poor | Good | Good | Good | Good | Good | Good | Good |

TABLE 5-continued

| | Comparative example | | | | | | | | | | |
|---|---|---|---|---|---|---|---|---|---|---|---|
| | 1 | 2 | 3 | 4 | 5 | 6 | 7 | 8 | 9 | 10 | 11 |
| (3) Persistence of anti-adhesion effect | Poor | Poor | Good | Poor | Fair | Fair | Poor | Poor | Good | Good | Good |
| (4) Storage stability at 40° C. | Good | Good | Good | Good | Good | Good | Good | Good | Fair | Fair | Good |
| at 25° C. | Good | Good | Fair | Good | Fair | Good | Good | Good | Fair | Fair | Good |
| at −5° C. | Good | Good | Poor | Good | Poor | Poor | Good | Poor | Poor | Poor | Poor |

\* Amount of water added relative to the amounts of the Components (A) to (C) and Another component, the amounts being defined as 100

Anti-adhesion agent compositions for asphalt were prepared with the proportions shown in Tables 3 to 5 and subjected to tests below. The symbols "%" in Tables 3 to 5 represent mass %. The results are also shown in Tables 3 to 5. The compositions having "Good" or "Excellent" results in all the tests were evaluated as having passed.

Tests for Anti-Adhesion Agents for Asphalt
(1) Spraying Test of Diluted Solution Onto Metal Surface Solutions prepared by diluting the anti-adhesion agents 10 fold with water were sprayed onto an SS400 steel product having dimensions of 20 cm×25 cm three times (about 2 g) with a spray bottle. Then, the state of the metal surface was visually inspected and evaluated in accordance with the following criteria.

Criteria
 Excellent: uniformly spread over the entire metal surface
 Good: spread over the entire metal surface
 Fair: non-uniformly present on the metal surface
 Poor: present in the form of droplets on the metal surface and not conforming to the shape of the metal surface (2) Anti-Adhesion Property Test Solutions prepared by diluting the anti-adhesion agents 10 fold with water were sprayed onto an SS400 steel product having dimensions of 20 cm×25 cm three times (about 2 g) with a spray bottle. Then, 1 g of straight asphalt (penetration number: 60 to 80, JIS K2207) heated to 200° C. was placed on the sprayed surface of the SS400 steel product. Furthermore, another SS400 steel product having dimensions of 20 cm×25 cm was placed under a load of 3.0 kg on the straight asphalt and left for a minute at room temperature. Then, the upper SS400 steel product was removed and the state of the lower SS400 steel product sprayed with the solutions was visually inspected and evaluated in accordance with the following criteria.

Criteria
 Excellent: no adhesion of asphalt
 Good: slight adhesion of asphalt
 Poor: considerable adhesion of asphalt (3) Persistence Test of Anti-Adhesion Effect Solutions prepared by diluting the anti-adhesion agents 10 fold with water were sprayed onto an SS400 steel product having dimensions of 20 cm×25 cm three times (about 2 g) with a spray bottle. Then, the following process was performed: 1 g of straight asphalt (penetration number: 60 to 80, JIS K2207) heated to 200° C. was placed on the sprayed surface of the SS400 steel product; Furthermore, another SS400 steel product having dimensions of 20 cm×25 cm was placed under a load of 3.0 kg on the straight asphalt and left for a minute at room temperature; the upper SS400 steel product was then removed and the state of the lower SS400 steel product sprayed with the solutions was visually inspected. This process was repeated five times in total and the adhesion of asphalt to the SS400 steel product in each process was visually inspected and evaluated in accordance with the following criteria.

Criteria
 Excellent: no adhesion of asphalt was observed during the process repeated five times
 Good: adhesion of asphalt was observed in the fourth process
 Fair: adhesion of asphalt was observed in the second or third process
 Poor: adhesion of asphalt was observed in the first process (4) Storage Stability Test Solutions prepared by diluting the anti-adhesion agents 10 fold with water were stored at 40° C., 25° C., and −5° C. for a month. Then, the appearance of the solutions was inspected and evaluated in accordance with the following criteria.

Criteria
 Good: no alteration was observed
 Fair: partial separation or partial solidification was observed
 Poor: separation or solidification was observed

What is claimed is:

1. An anti-adhesion agent composition for asphalt, the anti-adhesion agent composition comprising:
   (A) a copolymer having an average molecular weight of 5,000 to 100,000 and including constitutional units represented by Formulae (1) and (2) below in which a ratio of the constitutional unit represented by Formula (1) to the constitutional unit represented by Formula (2) is 3:7 to 7:3;
   (B) a surfactant that is at least one selected from a betaine amphoteric surfactant, an amino acid amphoteric surfactant, a polyoxyethylene alkylamine surfactant, an alkanolamide surfactant, and an amine oxide surfactant; and
   (C) a water-soluble polyhydric alcohol,
   wherein the anti-adhesion agent composition contains 0.5 to 10 mass % of the copolymer (A), 0.1 to 5 mass % of the surfactant (B), and 85 to 99.4 mass % of the water-soluble polyhydric alcohol (C),

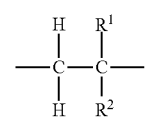

(1)

where $R^1$ represents a hydrogen atom or a methyl group; and $R^2$ represents an alkyl group containing 4 to 18 carbon atoms or a phenyl group,

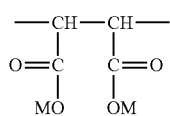 (2)

where Ms independently represent a hydrogen atom, an alkali metal, ammonium, or an organic ammonium.

2. The anti-adhesion agent composition for asphalt according to claim 1, wherein the surfactant (B) is at least one selected from compounds represented by Formulae (3) to (7) below:

the betaine amphoteric surfactant that is a compound represented by Formula (3)

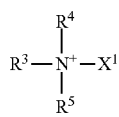 (3)

where $R^3$ represents an alkyl group containing 10 to 18 carbon atoms, an alkenyl group containing 10 to 18 carbon atoms, or $R^6NH(CH_2)_p$—; $R^4$ and $R^5$ independently represent an alkyl group containing 1 to 3 carbon atoms; $X^1$ represents —$(CH_2)_qCOO^-$, —$CH_2CH(OH)CH_2SO_3^-$, or —$(CH_2)_rPO_4^-$; $R^6$ represents an aliphatic acyl group containing 10 to 18 carbon atoms; and p, q, and r independently represent an integer of 1 to 3, the amino acid amphoteric surfactant that is a compound represented by Formula (4)

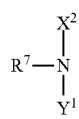 (4)

where $R^7$ represents an alkyl group containing 10 to 18 carbon atoms, an alkenyl group containing 10 to 18 carbon atoms, or $R^8NX^3(CH_2)_s$—; $X^2$ represents a hydrogen atom, a hydroxyethyl group, or —$(CH_2)_t$COOM$^1$; $Y^1$ represents —$(CH_2)_u$COOM$^2$; $M^1$ and $M^2$ independently represent a hydrogen atom, an alkali metal, an alkaline-earth metal, ammonium, or an organic ammonium; $R^6$ represents an aliphatic acyl group containing 10 to 18 carbon atoms; $X^3$ represents a hydrogen atom or a hydroxyethyl group; and s, t, and u independently represent an integer of 1 to 3, the polyoxyethylene alkylamine surfactant that is a compound represented by Formula (5)

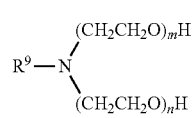 (5)

where $R^9$ represents an alkyl group containing 10 to 18 carbon atoms or an alkenyl group containing 10 to 18 carbon atoms; m and n represent an average degree of polymerization and m+n is 1 to 30, the alkanolamide surfactant that is a compound represented by Formula (6)

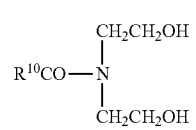 (6)

where $R^{10}CO$ represents an aliphatic acyl group containing 10 to 18 carbon atoms, and the amine oxide surfactant that is a compound represented by Formula (7)

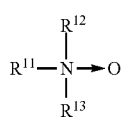 (7)

where $R^{11}$ represents an alkyl group containing 10 to 18 carbon atoms, an alkenyl group containing 10 to 18 carbon atoms, or $R^{14}NH(CH_2)_v$—; $R^{12}$ and $R^{13}$ independently represent an alkyl group containing 1 to 3 carbon atoms or a hydroxyalkyl group containing 1 to 3 carbon atoms; $R^{14}$ represents an aliphatic acyl group containing 10 to 18 carbon atoms; and v represents an integer of 1 to 3.

* * * * *